United States Patent
Roblek et al.

(10) Patent No.: US 9,069,849 B1
(45) Date of Patent: Jun. 30, 2015

(54) METHODS FOR ENFORCING TIME ALIGNMENT FOR SPEED RESISTANT AUDIO MATCHING

(71) Applicant: Google Inc., Mountain View, CA (US)

(72) Inventors: Dominik Roblek, Mountain View, CA (US); Gheorghe Postelnicu, Zurich (CH); Matthew Sharifi, Zurich (CH)

(73) Assignee: Google Inc., Mountain View, CA (US)

( * ) Notice: Subject to any disclaimer, the term of this patent is extended or adjusted under 35 U.S.C. 154(b) by 247 days.

(21) Appl. No.: 13/648,472

(22) Filed: Oct. 10, 2012

(51) Int. Cl.
*G06F 17/00* (2006.01)
*G06F 17/30* (2006.01)
*G10L 21/04* (2013.01)

(52) U.S. Cl.
CPC .......... *G06F 17/30743* (2013.01); *G10L 21/04* (2013.01)

(58) Field of Classification Search
USPC .......................................................... 700/94
See application file for complete search history.

(56) References Cited

U.S. PATENT DOCUMENTS

| 8,363,938 B2 * | 1/2013 | Malfait et al. ................. 382/170 |
| 2003/0086341 A1 * | 5/2003 | Wells et al. ................. 369/13.56 |
| 2009/0265174 A9 * | 10/2009 | Wang et al. ................... 704/273 |

* cited by examiner

*Primary Examiner* — Andrew C Flanders
(74) *Attorney, Agent, or Firm* — Amin, Turocy & Watson, LLP

(57) ABSTRACT

Systems and methods are provided herein relating to speed resistant audio matching. Descriptors can be generated for a received audio signal and matched with reference descriptors. A set of hits for respective reference samples can be generated based on the matching. A histogram can then be generated that correlates probe sample hit time with reference sample hit time. In one implementation, a rolling window can be used in analyzing the histogram allowing for slight variances in the timing between probe sample hits and reference sample hits. In another implementation, the histogram generated can be based on an estimated time stretch of the probe sample. In yet another implementation, a set of histograms can be generated based on a minimum speed change, a maximum speed change, and a speed step. Histograms can be evaluated to determine a most likely matching histogram.

19 Claims, 11 Drawing Sheets

METHODS FOR ENFORCING TIME ALIGNMENT FOR SPEED RESISTANT AUDIO MATCHING

TECHNICAL FIELD

This application relates to audio matching, and more particularly to enforcing time alignment for speed resistant audio matching.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine the identity of the audio sample.

Typically, a match is determined between a probe sample and a specific reference sample by examining hits which are in common between descriptors of the probe sample and descriptors of the specific reference sample. Respective hits can be associated with a time in the probe sample and a time in the reference sample. As hits indicate a match at a particular point in time, additional hits can be aggregated over time by looking along a projection of hits. However, if a probe sample is sped up or slowed down, relative to a reference sample, the probe hit time and the reference hit time may not align in a manner that indicates positive match. This can present challenges during audio matching, as transformations that affect speed of audio samples are common, for example, samples recorded over broadcast radio. Thus, there exists a need to accurately match audio samples suffering from time stretch or time compression distortions.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

An input component receives an audio sample. A descriptor component generates a set of descriptors based on the audio sample. A matching component generates a set of hits for respective reference samples among a set of reference samples based on comparing the set of descriptors to a set of reference descriptors associated with reference samples among the set of reference samples wherein hits in the set of hits indicate a match between one or more audio sample descriptor and one or more reference descriptor and are associated with a sample hit time and a reference hit time. A histogram component generates a histogram for respective reference samples based on the sample hit time and the reference hit time for one or more hits in the set of hits. An evaluation component evaluates sets of histograms to determine a most likely matching histogram.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
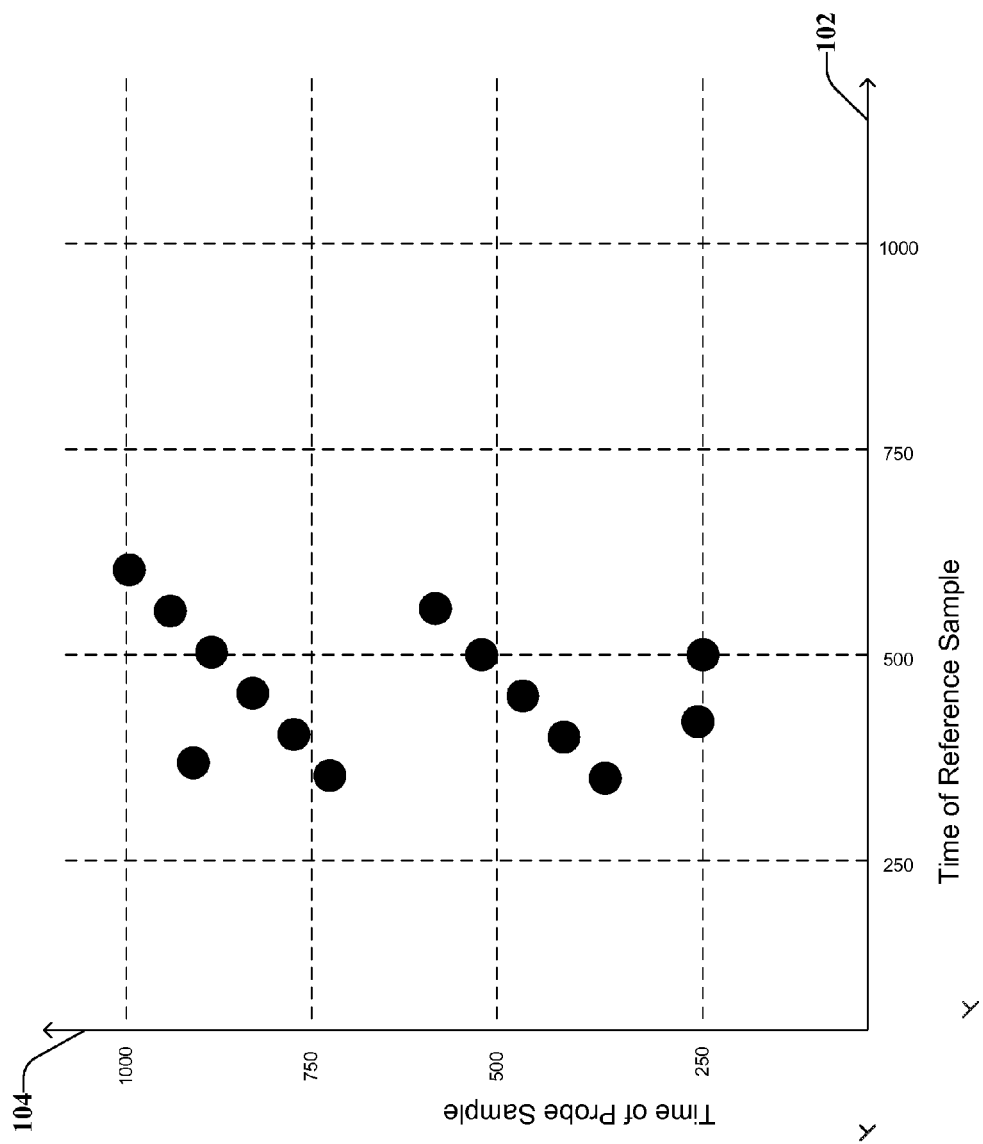
FIG. 1 illustrates an example plot of hits between a probe sample and a reference sample in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves identifying unique characteristics in an audio sample that can be used in comparison to unique characteristics of reference samples to identify snippets containing the same audio content. As a starting point for this analysis, a spectrogram of the audio signal can be constructed. A spectrogram is a time-varying spectral representation of an audio sample. It forms an image, with time on one axis and frequency on the other axis, while the values held at each location represent the amplitude of a particular frequency at a specific point in time.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining measurements over time on the frequency axis to generate a spectrogram image of frequency amplitudes over time.

A second technique involves using a short-time Fourier transform ("STFT") to break down an audio sample into time windows, where each window is Fourier transformed to calculate magnitude of the frequency spectrum for duration of each window. Combining a plurality of windows side by side on the time axis of the spectrogram creates an image of frequency amplitudes over time.

Creating and storing in a database an entire spectrogram for a plurality of reference samples can use large amounts of storage space and affect scalability of an audio matching system. Therefore, it can be desirable to instead calculate and store compact descriptors of reference samples versus an entire spectrogram. One method of calculating descriptors is to first determine individual interest points that identify unique characteristics of local features of the time-frequency representation of the reference sample. Descriptors can then be computed as functions of sets of interest points.

In a typical large scale descriptor audio matching system, a set of reference samples can number in the millions or tens of millions. When comparing descriptors of an audio sample with descriptors of millions of reference samples, there can be many "hits" or potential matches between the audio sample descriptor(s) and reference sample descriptor(s). For example, in response to a lookup of a short, fifteen second audio sample against an index of over ten million references, there could be as many as five to ten million hits associated with some five million reference samples.

Typically, a match is determined between a probe sample and a specific reference sample by examining the hits which are in common between descriptors of the probe sample and the descriptors of the specific reference sample. Each hit can be associated with a time in the probe sample and a time in the reference sample. As hits indicate a match at a particular point in time, additional hits can be aggregated over time by looking along a projection of hits. A probe can be identified if it has multiple hits in a single reference which are all aligned in time.

In a situation where the probe sample is recorded in a noisy environment (e.g., a bar or a shopping center) distortions can be introduced into the signal that can affect the accuracy of an audio matching system. Audio samples recorded from broadcast radio, for example, are often sped up or slowed down in a way that isn't discernible to most listeners, yet can negatively impact accuracy in audio matching. When a probe sample is sped up or slowed down, relative to a reference sample, the probe hit times and reference hit times may not align in a way that indicates a positive match.

Systems and methods herein provide for audio matching solutions with tolerance to time stretching. First, a set of descriptors can be generated based on a received audio sample. The set of descriptors can then be matched to a set of reference descriptors associated with reference samples. A set of hits for respective reference samples can be generated based on the matching. A histogram can then be generated that correlates probe sample hit times with reference sample hit times. In one implementation, a rolling window can be used in analyzing the histogram allowing for slight variances in the timing between probe sample hits and reference sample hits. In another implementation, the histogram generated can be based on an estimated time stretch of the probe sample. In yet another implementation, a set of histograms can be generated based on a minimum speed change, a maximum speed change, and a speed step. Histograms can then be evaluated to determine a most likely matching histogram.

Referring now to FIG. 1, there is illustrated an example plot of hits between a probe sample and a reference sample in accordance with implementations of this disclosure. Each point on the plot corresponds to a hit between a descriptor of the probe sample and a descriptor of the reference sample. The vertical axis 104 or y axis plots the time in the probe sample of the hit. The horizontal axis 102 or x axis plots the time of the reference sample of the hit. It can be appreciated, that the probe sample can be, for example, a ten or fifteen second sample of audio at any point in time—any suitable time frame for samples can be utilized. A fifteen second sample could be the last fifteen seconds of a reference, the first fifteen seconds of a reference sample, or any fifteen second period within the reference sample. Thus, a matching reference sample hit and a probe sample hit may not, and most likely will not, match at the same point in time in each respective sample. However, a series of hits between a probe sample and a matching reference sample should be temporally aligned, that is, the difference in time between a probe sample hit and a reference sample hit should remain relatively constant if the two are matching.

For samples suffering from time stretch distortions, the difference in time need not be identical, as stated supra, time stretching can slightly alter the difference in time between a probe sample hit and a reference sample hit over time. As each point on the plot corresponds to both a probe sample time and a reference sample time, the value (x-y) can be used to calculate the time difference for each point. It can be appreciated that (y-x) can also be used, but for ease of explanation, the example used going forward will be (x-y). For a probe sample and a matching reference sample, the value of (x-y) should remain relatively constant for each hit, and can be identified in FIG. 1 by a string of diagonally aligned hits on the plot.

Figure 2:
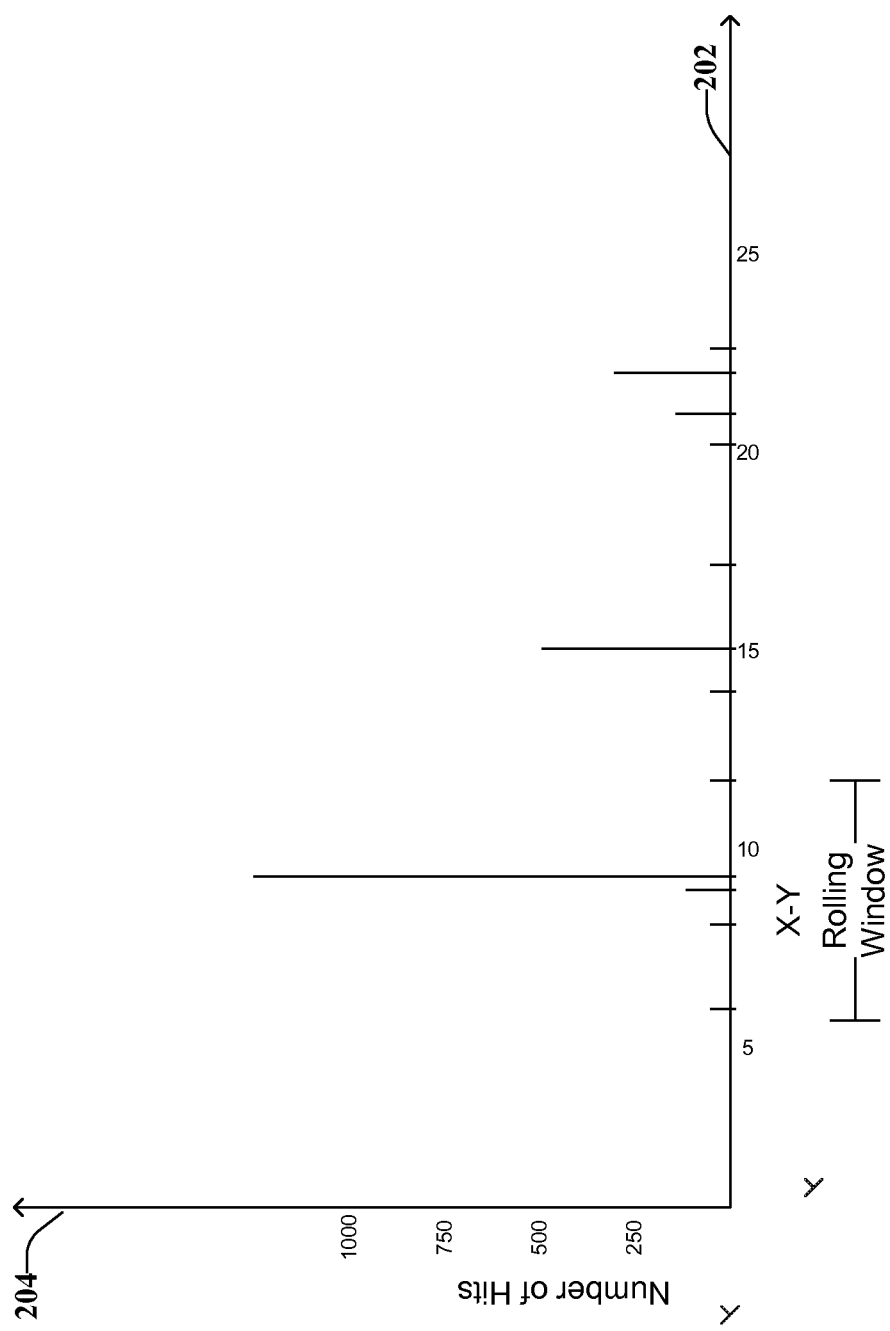
FIG. 2 illustrates an example histogram aggregating hits between a probe sample and a reference sample including a rolling window in accordance with implementations of this disclosure.

Referring now to FIG. 2, there is illustrated an example histogram aggregating hits between a probe sample and a reference sample in accordance with implementations of this disclosure. The vertical axis 204 or Y axis plots the time number of hits. The horizontal axis 102 or X axis plots (x-y) values of hits as described with regard to FIG. 1. Evidence of sharp peaks on the histogram can denote common (x-y) values shared by a number of hits. Thus, the sharper, e.g., the higher a single peak is in the histogram, the more likely the reference sample is a match. It can be appreciated that histograms can be analyzed for a variety of features indicative of a match beyond which histogram has the sharpest peak. It can be further appreciated that generating a histogram for every potential match can become computationally expensive; thus, eliminating false positives prior to generating a histogram can provide more efficient audio matching.

For a probe sample that is sped up or slowed down relative to its matching reference sample, the histogram may not show a sharp peak. For example, A probe sample sped up at a rate of 5% can drop a peak on a histogram from over 500 hits to less than 10. This is because reference hits do not line on a 45 degree line, and instead, may lie on a line with a different angle. Thus, in order to match clips which are time stretched or time compressed, accurate matching must occur under these circumstances.

One implementation to correct for time stretching or time compressing is to project a histogram for lines at all angles which are expected to be encountered. A minimum speed change, a maximum speed change and a speed step can all be defined. For example, if a minimum speed change and maximum speed change are set to −5% and +5% respectively, and a speed step is set at 0.25%, histograms can be generated for each speed deviation from the minimum to the maximum, as defined by the speed step. The histogram with highest peak among the set of histograms generated can identify the rate of the probe relative to rate of the reference. Although highly accurate if the probe is stretched or compressed within the minimum speed change and maximum speed change limits, generating a projection of hits for each potential speed step for each reference sample can be computationally expensive because it may have to be done for millions of potential matching reference samples.

In another implementation, a two-level projection histogram can be implemented. First, a histogram can be generated based on the probe sample hit times and reference sample hit times as depicted in FIG. 2. A rolling window can then be rolled over the histogram to determine a maximum number of windowed hits within the rolling window at any point during the roll. The width of the rolling window can cover the maximum time stretch expected to be encountered. For example, if a probe sample is 15 seconds in duration, and there is an expectation to handle a 10% time stretch, then the window can be 1.5 seconds wide (e.g., multiplying 0.10 by 15 seconds).

If the maximum number of windowed hits meets or exceeds a windowed hit threshold, then those subset of hits within the wide window can be extracted. Evaluation can proceed by examining the subset of hits, such as by generating sets of histograms based on a minimum speed change, maximum speed change, and a speed step as described supra. If a clear peak is identified in one of the stretched histograms, then the associated reference sample is likely a match. In this sense, computationally expensive sets of histograms (e.g., those based on maximum speed change, minimum speed change, and a speed step) will only be generated for those samples where the maximum number of hits meet or exceed the windowed hit threshold.

In yet another implementation, a time stretch amount can be estimated between the audio sample and reference samples based on the sample hit time and the reference hit time. For example, assuming we have the following hits with respective Probe Hit Times and Reference Hit Times: Hit 1 (Probe=10, Reference=100); Hit 2 (Probe=22, Reference=110); Hit 3 (Probe=35, Reference=120). Every pair of hits can be examined to a time stretch estimate for each pair. For example:

Hit 1 vs. Hit 2 can be computed as (22−10)/(110−100)=.2

Hit 2 vs. Hit 3 can be computed as (35−22)/(120−110)=1.3

Hit 1 vs. Hit 3 can be computed as (35−10)/(120−100)=1.25

The estimated time stretch from each pair can be aggregated for all hits, and, in one example, the median time stretch can be used, in this case a 25% speed up, as an estimated time stretch. It can be appreciated that other means such as simple average or weighted average can be used as well in determining an estimated time stretch. A single histogram projection can then be computed based on the estimated time stretch.

Figure 3:
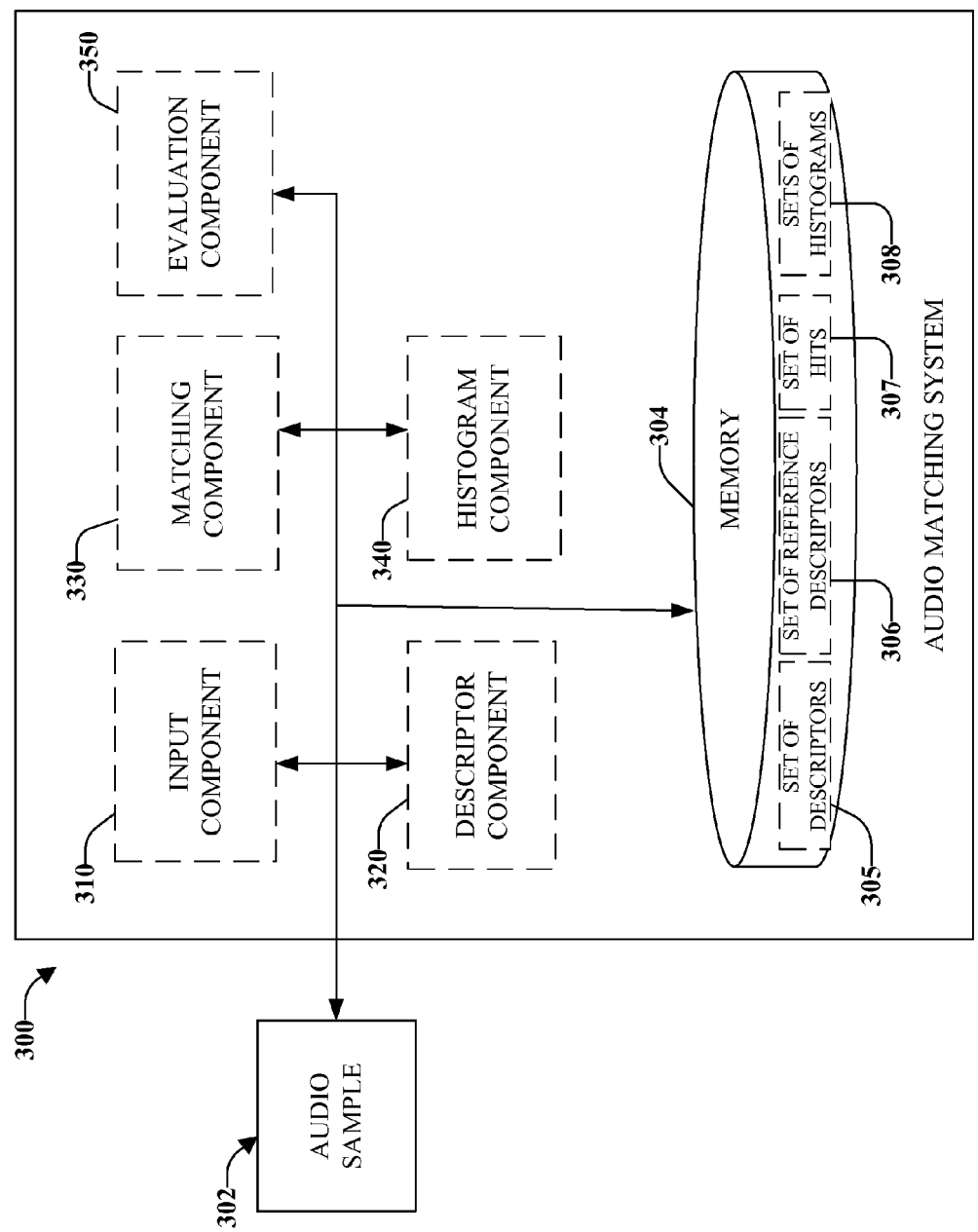
FIG. 3 illustrates a high-level functional block diagram of an example audio matching system in accordance with implementations of this disclosure.

Referring now to FIG. 3, there is illustrated a high-level functional block diagram of an example audio matching system in accordance with implementations of this disclosure. In FIG. 3, an audio matching system 300 includes an input component 310, a descriptor component 320, a matching component 330, a histogram component 340, an evaluation component 350, and a memory 304, each of which may be coupled as illustrated. An input component 310 can receive an audio sample. Descriptor component 320 generates a set of descriptors based on the audio sample. The set of descriptors 305 can be stored within memory 304 for access by other components.

Matching component 330 generates a set of hits for respective reference samples among a set of reference samples based on comparing the set of descriptors to a set of reference descriptors associated with reference samples among the set of reference samples wherein hits in the set of hits indicate a match between one or more audio sample descriptor and one or more reference descriptor and are associated with sample hit times and reference hit times. The set of reference descriptors 306 can be stored within memory 304 for access by components of system 300. The set of hits 307 can be stored within memory 304 for access by components of system 300.

Histogram component 340 generates a histogram for respective reference samples based on the sample hit time and the reference hit time for one or more hits in the set of hits. Sets of histograms 308 can be stored within memory 304 for access by component of system 300. In one implementation, histogram component 340 further generates a set of histograms for respective reference samples based on a minimum speed change, a maximum speed change, and a speed step.

Evaluation component 350 evaluates sets of histograms to determine a most likely matching histogram. For example, sets of histograms can include multiple histograms related to a single reference samples, or multiple histograms related to multiple reference samples. In one implementation, the histogram with highest peak can be identified as the most likely matching histogram.

Figure 4:
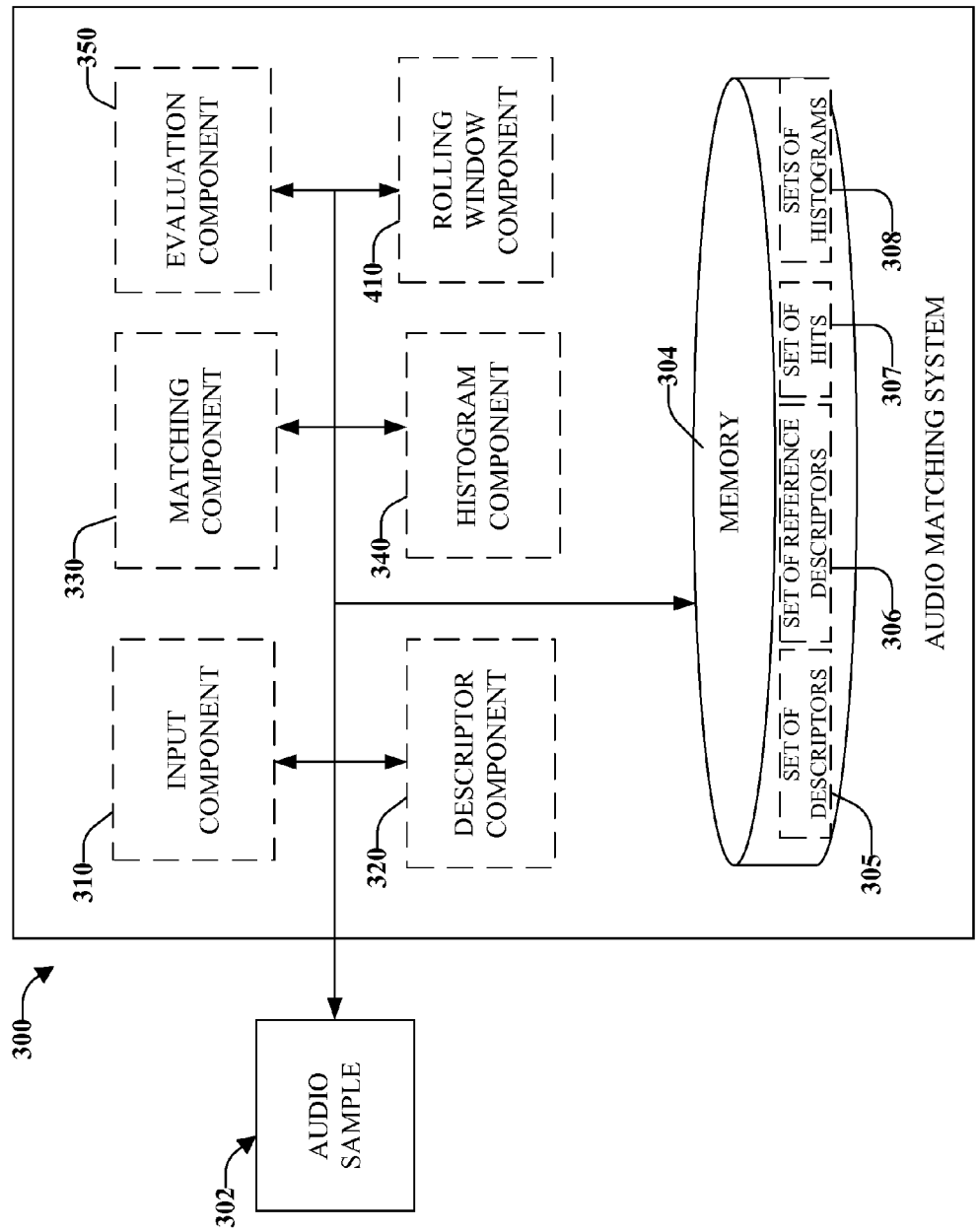
FIG. 4 illustrates a high-level functional block diagram of an example audio matching system including a rolling window component in accordance with implementations of this disclosure.

Referring now to FIG. 4, there is illustrated a high-level functional block diagram of an example audio matching system including a rolling window component 410 in accordance with implementations of this disclosure. Rolling window component 410 rolls a window over respective histograms for respective reference samples and, upon completion of the rolling, determines a maximum number of windowed hits within the window at any point during the roll, wherein the width of the window is based on time stretch sensitivity. In one implementation, rolling window component 410 further extracts a subset of the set of hits where the subset of the set of hits are the hits within the window at the maximum number of windowed hits. Rolling window component 410 can further compare the subset of the set of hits with a windowed hit threshold. In one evaluation component 350 evaluates histograms in set of histograms that meet the windowed hit threshold further based on the subset of hits.

Figure 5:
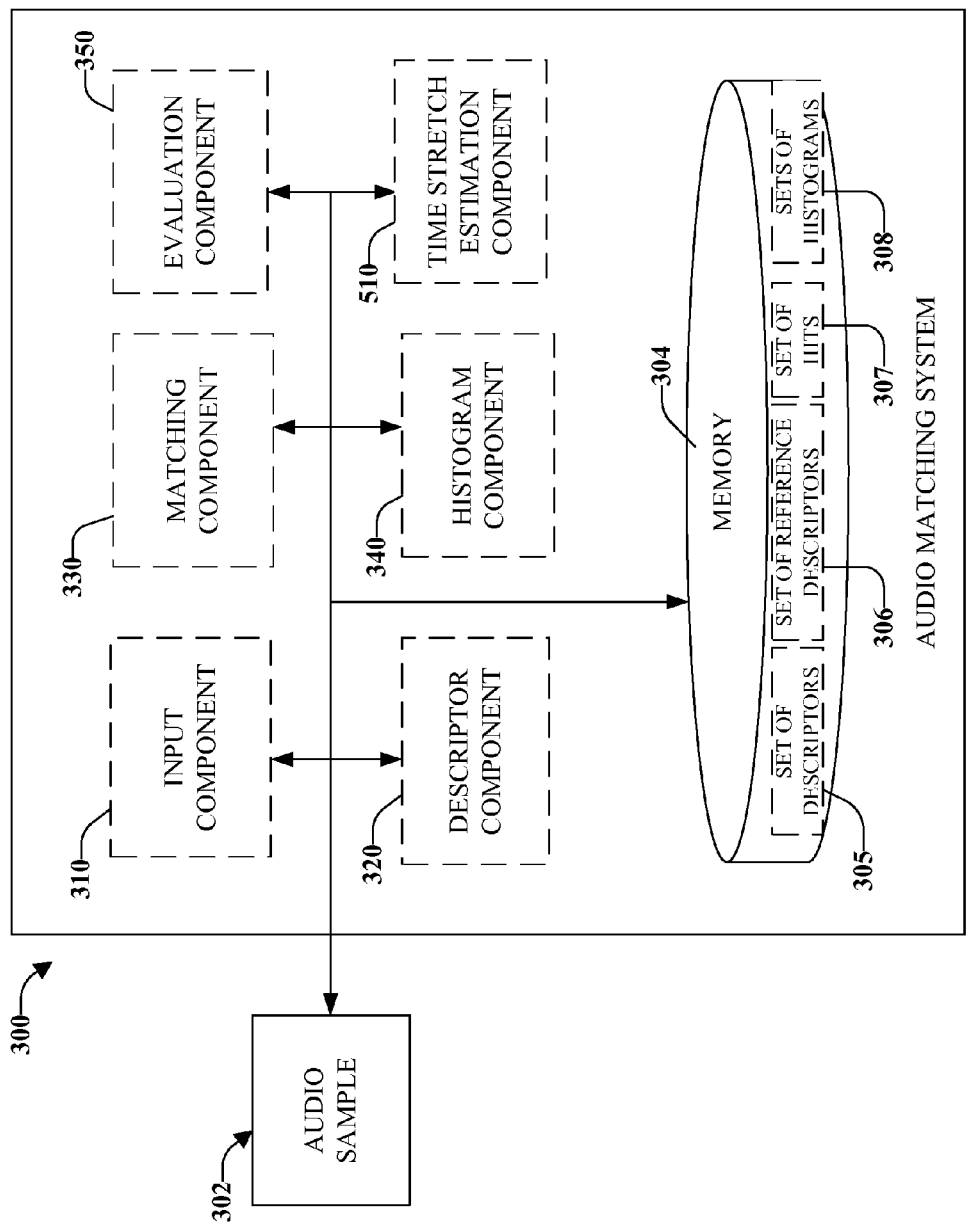
FIG. 5 illustrates a high-level functional block diagram of an example audio matching system including a time stretch estimation component in accordance with implementations of this disclosure.

Referring now to FIG. 5, there is illustrated a high-level functional block diagram of an example audio matching system including a time stretch estimation component 510 in accordance with implementations of this disclosure. Time stretch estimation component 510 estimates time stretch amount between the audio sample and respective reference samples based on the sample hit times and reference hit times for hits in the set of hits. In one implementation, histogram component 340 generates the histogram for respective reference samples further based on the time stretch amount associated with the reference sample.

FIGS. 6-9 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 6:
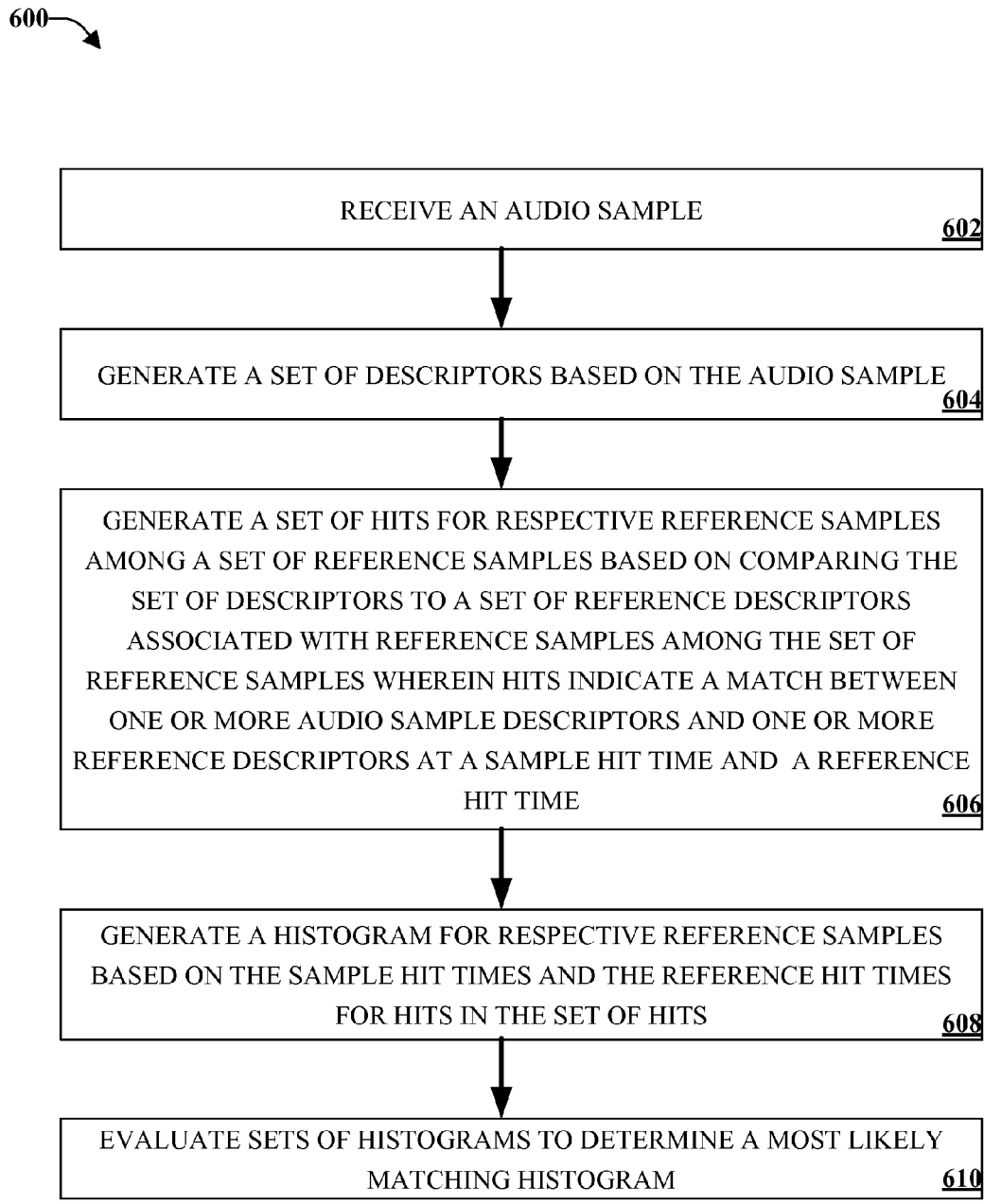
FIG. 6 illustrates an example method for audio matching in accordance with implementations of this disclosure.

Referring now to FIG. 6, there is illustrated an example method for audio matching in accordance with implementations of this disclosure. At 602, an audio sample can be received (e.g., by an input component 310). At 604, a set of descriptors can be generated (e.g., by a descriptor component 320) based on the audio sample. In one implementation, the receiving the audio sample is incremental and in response to the incremental reception, the generating the set of descriptors is dynamic. For example, the audio sample can be received from a client device via a stream and as the stream is incrementally received, descriptors can be dynamically generated. At 606, a set of hits for respective reference samples among a set of reference samples can be generated (e.g., by a matching component 330) based on comparing the set of descriptors to a set of reference descriptors associated with reference samples among the set of reference samples wherein hits indicate a match between one or more audio sample descriptors and one or more reference descriptors at a sample hit times and a reference hit time. At 608, a histogram can be generated (e.g., by a histogram component 340) based on the sample hit times and the reference hit times for hits in the set of hits. At 610, a set of histograms can be evaluated (e.g., by an evaluation component 350) to determine a most likely matching histogram.

Figure 7:
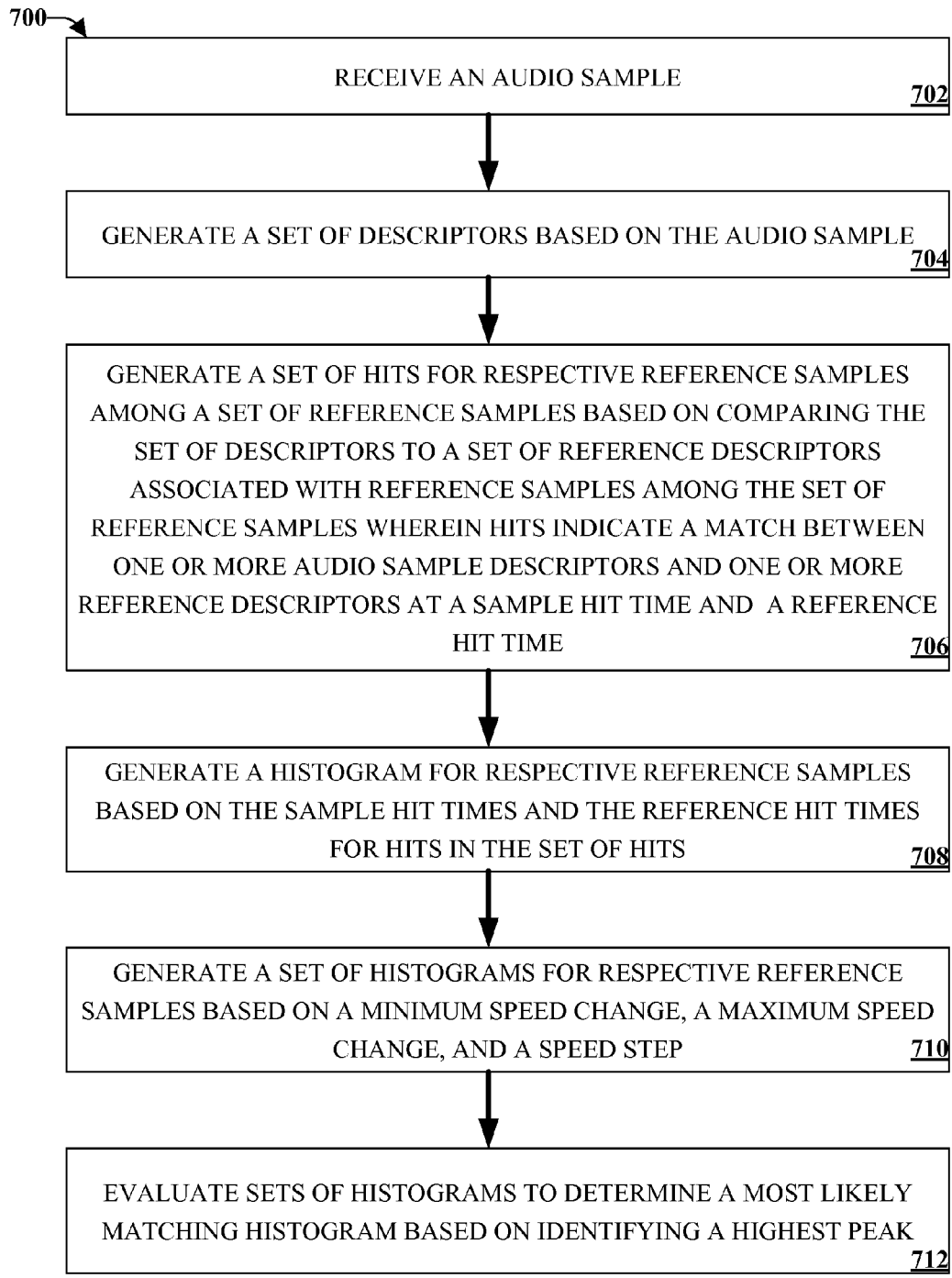
FIG. 7 illustrates an example method for audio matching including testing a range of time stretches in accordance with implementations of this disclosure.

FIG. 7 illustrates an example method for audio matching including testing a range of time stretches in accordance with implementations of this disclosure. At 702, an audio sample can be received (e.g., by an input component 310). At 704, a set of descriptors can be generated (e.g., by a descriptor component 320) based on the audio sample. At 706, a set of hits for respective reference samples among a set of reference samples can be generated (e.g., by a matching component 330) based on comparing the set of descriptors to a set of reference descriptors associated with reference samples among the set of reference samples wherein hits indicate a match between one or more audio sample descriptors and one or more reference descriptors at a sample hit times and a reference hit time. At 708, a histogram can be generated (e.g., by a histogram component 340) based on the sample hit times and the reference hit times for hits in the set of hits. At 710, a set of histograms can be generated (e.g., by a histogram component 340) based on a minimum speed change, a maximum speed change, and a speed step. At 712, the sets of histogram can be evaluated (e.g., by an evaluation component 350) based on identifying a highest peak.

Figure 8:
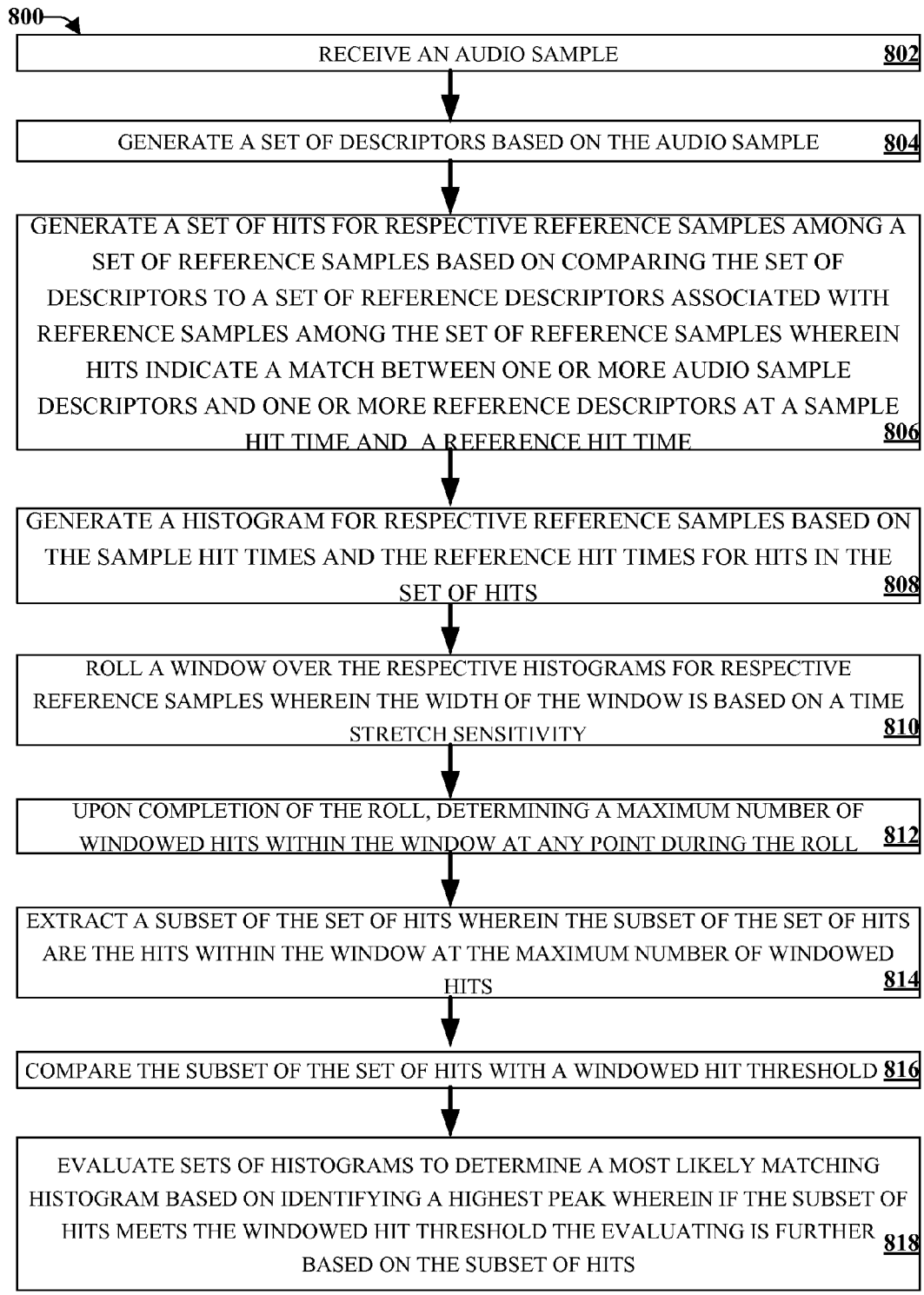
FIG. 8 illustrates an example method for audio matching including using a rolling window within a histogram in accordance with implementations of this disclosure.

FIG. 8 illustrates an example method for audio matching including using a rolling window within a histogram in accordance with implementations of this disclosure. At 802, an audio sample can be received (e.g., by an input component 310). At 804, a set of descriptors can be generated (e.g., by a descriptor component 320) based on the audio sample. At 806, a set of hits for respective reference samples among a set of reference samples can be generated (e.g., by a matching component 330) based on comparing the set of descriptors to a set of reference descriptors associated with reference samples among the set of reference samples wherein hits indicate a match between one or more audio sample descriptors and one or more reference descriptors at a sample hit time and a reference hit time. At 808, a histogram can be generated (e.g., by a histogram component 340) based on the sample hit times and the reference hit times for hits in the set of hits.

At 810, a windowed can be rolled (e.g., by a rolling window component 410) over the respective histograms for respective reference samples wherein the width of the window is based on a time stretch sensitivity. At 812, upon completion of the roll, a maximum number of windowed hits within the window at any point during the roll can be determined (e.g., by a rolling window component 410). At 814, a subset of the set of hits can be extracted (e.g., by a rolling window component 410) wherein the subset of the set of hits are the hits within the window at the maximum number of windowed hits. At 816, the subset of the set of hits can be compared (e.g., by a rolling window component 410). At 818, sets of histograms can be evaluated (e.g., by an evaluation component 350) to determine a most likely matching histogram based on identifying a highest peak wherein if the subset of hits meets the windowed hit threshold, the evaluating is further based on the subset of hits.

Figure 9:
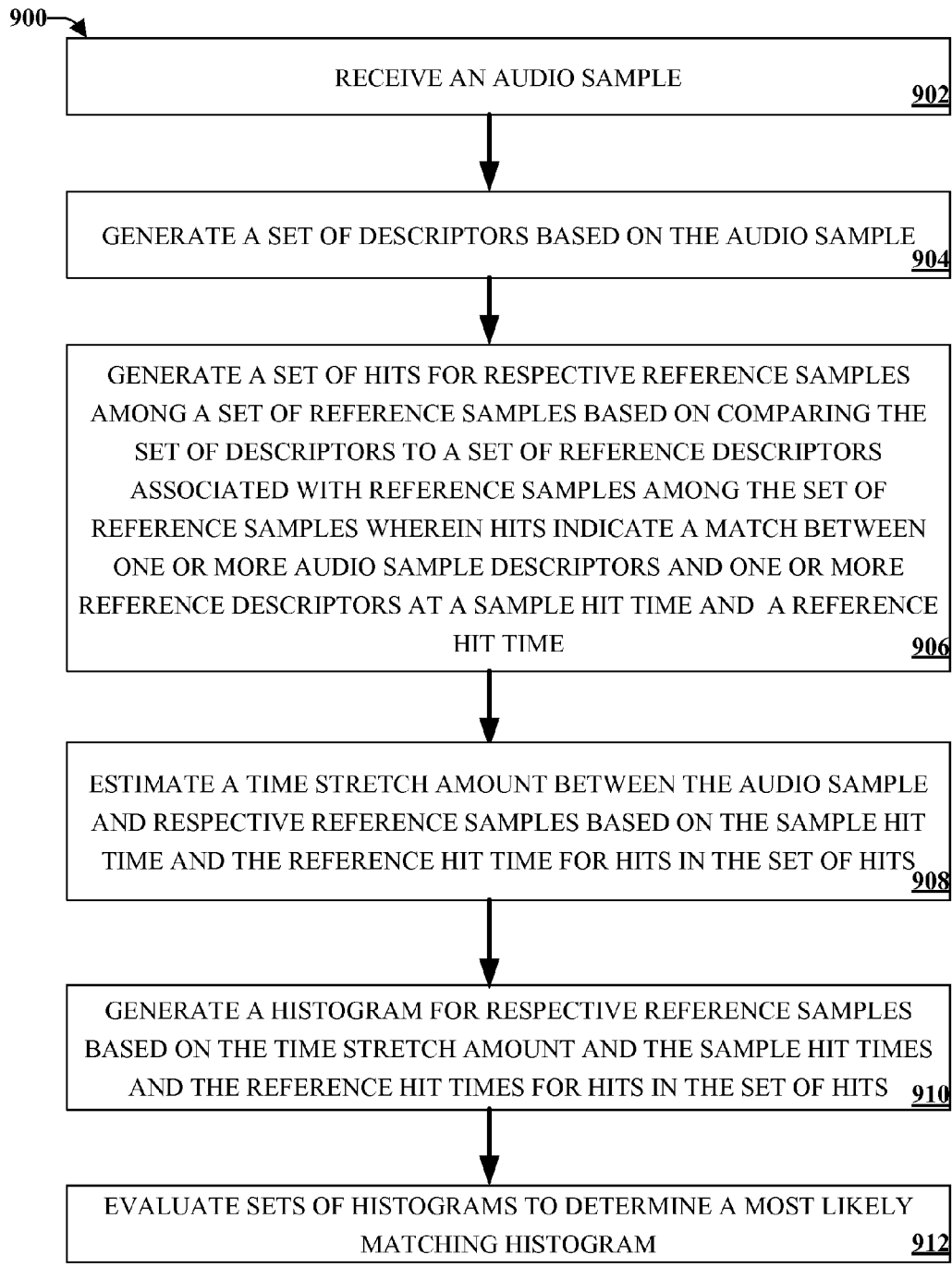
FIG. 9 illustrates an example method for audio matching including using time stretch estimating in accordance with implementations of this disclosure.

FIG. 9 illustrates an example method for audio matching including using time stretch estimating in accordance with implementations of this disclosure. At 902, an audio sample can be received (e.g., by an input component 310). At 904, a set of descriptors can be generated (e.g., by a descriptor component 320) based on the audio sample. At 906, a set of hits for respective reference samples among a set of reference samples can be generated (e.g., by a matching component 330) based on comparing the set of descriptors to a set of reference descriptors associated with reference samples among the set of reference samples wherein hits indicate a match between one or more audio sample descriptors and one or more reference descriptors at a sample hit time and a reference hit time.

At 908, a time stretch amount can be estimated (e.g., by a time stretch estimation component 510) between the audio sample and respective reference samples based on the sample hit time and the reference hit time for this in the set of hits. At 910, a histogram can be generated (e.g., by a histogram component 340) based on the time stretch amount and the sample hit times and the reference hit times for hits in the set of hits. At 912, the set of histogram can be evaluated (e.g., by an evaluation component 350) to determine a most likely matching histogram.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
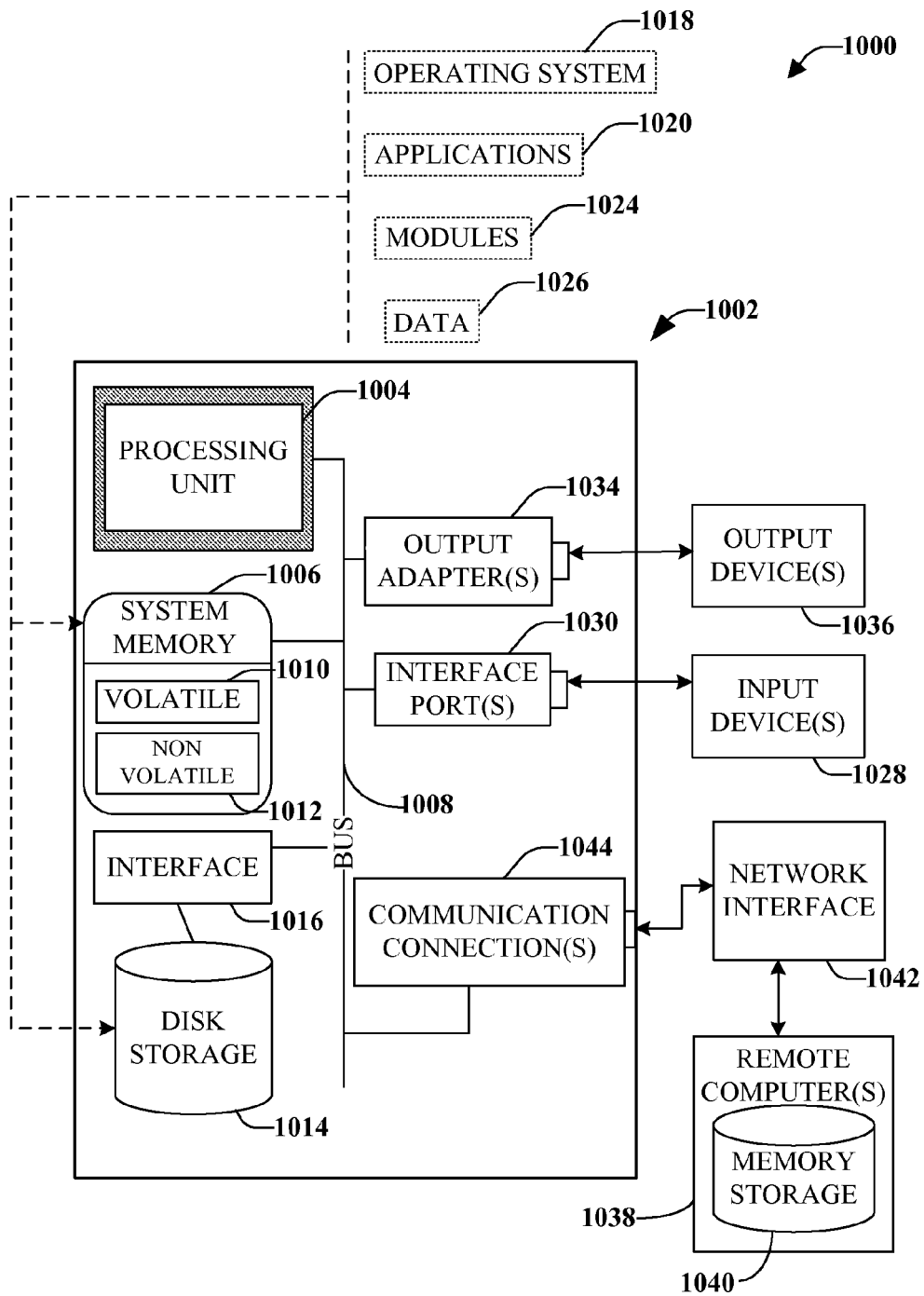
FIG. 10 illustrates an example block diagram of a computer operable to execute the disclosed architecture in accordance with implementations of this disclosure.

With reference to FIG. 10, a suitable environment 1000 for implementing various aspects of the claimed subject matter includes a computer 1002. It is to be appreciated that the computer, 1002 can be used in connection with implementing one or more of the systems or components shown and described in connection with FIGS. 1-4. The computer 1002 includes a processing unit 1004, a system memory 1006, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
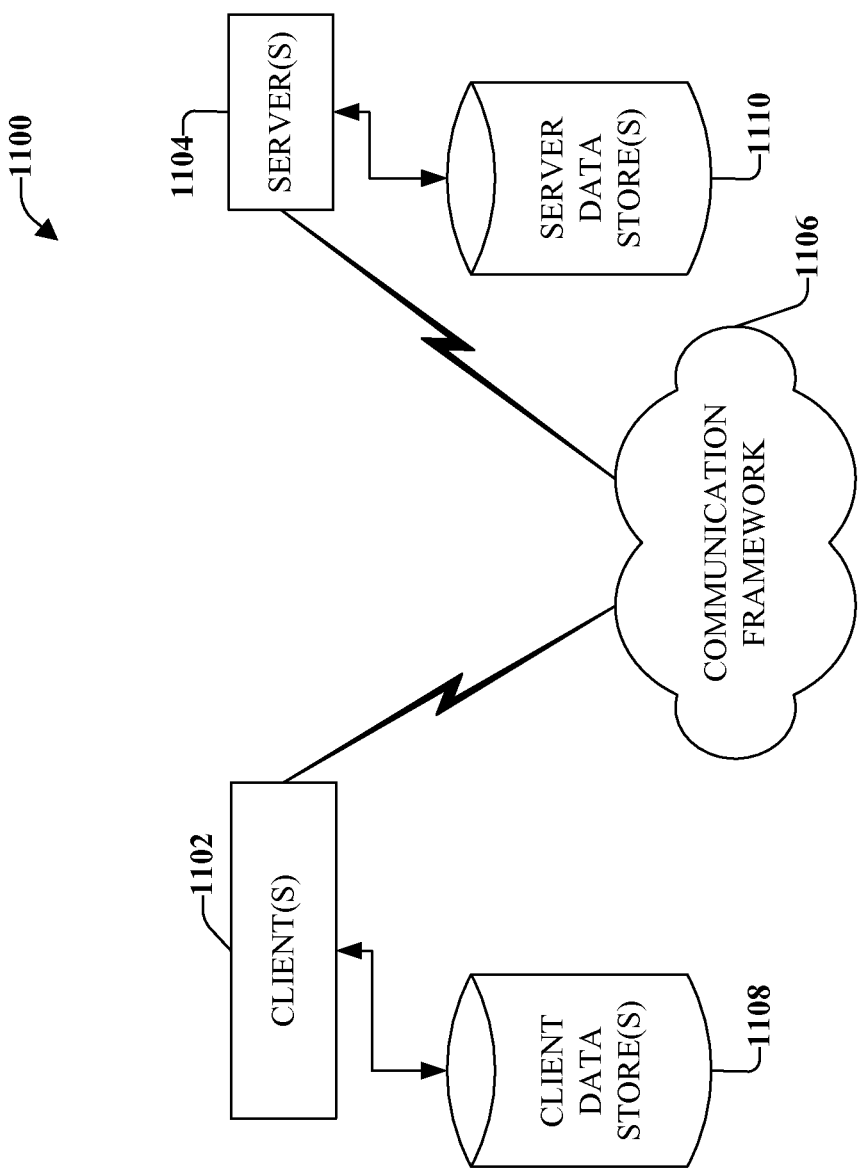
FIG. 11 illustrates an example schematic block diagram for a computing environment in accordance with implementations of this disclosure.

Referring now to FIG. 11, there is illustrated a schematic block diagram of a computing environment 1100 in accordance with the subject specification. The system 1100 includes one or more client(s) 1102, which can include an application or a system that accesses a service on the server 1104. The client(s) 1102 can be hardware and/or software (e.g., threads, processes, computing devices). The client(s) 1102 can house cookie(s), metadata, and/or associated contextual information and can also house threads to perform, for example, receiving an audio sample, generating descriptors, generating hits, generating histograms, evaluating histograms, estimating time stretches, rolling windows, etc. in accordance with the subject disclosure.

The system 1100 also includes one or more server(s) 1104. The server(s) 1104 can also be hardware or hardware in combination with software (e.g., threads, processes, computing devices). The servers 1104 can house threads to perform, for example, receiving an audio sample, generating descriptors, generating hits, generating histograms, evaluating histograms, estimating time stretches, rolling windows, etc. in accordance with the subject disclosure. One possible communication between a client 1102 and a server 1104 can be in the form of a data packet adapted to be transmitted between two or more computer processes where the data packet contains, for example, an audio sample or descriptors associated with an audio sample. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
   a memory that has stored thereon computer executable components; and
   a processor that executes the following computer executable components stored in the memory:
      an input component that receives an audio sample;
      a descriptor component that generates a set of descriptors based on the audio sample;
      a matching component that generates respective sets of hits for reference samples among a set of reference samples based on comparing the set of descriptors to a set of reference descriptors associated with reference samples among the set of reference samples, wherein a hit indicates a match between an audio sample descriptor and a reference descriptor at a sample hit time and a reference hit time;
      a histogram component that generates respective histograms for the reference samples based on the sample hit times and the reference hit times for hits in the respective sets of hits for the reference samples;
      a rolling window component that rolls a window over the respective histograms for the reference samples and, upon completion of the rolling, determines a maximum number of windowed hits within the window at any point during the roll, wherein the width of the window is based on time stretch sensitivity, and wherein the rolling window component further extracts a subset of the set of hits, where the subset of the set of hits are hits within the window at the maximum number of windowed hits; and
      an evaluation component that evaluates sets of histograms to determine a most likely matching histogram.

2. The system of claim 1, wherein the histogram component further generates respective sets of histograms for the reference samples based on at least one of a minimum speed change, a maximum speed change, or a speed step.

3. The system of claim 2, wherein the evaluation component evaluates the sets of histograms based on identifying a highest peak.

4. The system of claim 1, wherein the rolling window component further compares the subset of the set of hits with a windowed hit threshold.

5. The system of claim 4, wherein the evaluation component evaluates histograms in the sets of histograms that meet the windowed hit threshold further based on the subset of hits.

6. The system of claim 1, further comprising:
   a time stretch estimation component that estimates respective time stretch amounts between the audio sample and the reference samples based on the sample hit times and the reference hit times for hits in the respective sets of hits for the reference samples.

7. The system of claim 6, wherein the histogram component generates the respective histograms for the reference samples further based on the respective time stretch amounts associated with the reference samples.

8. A method comprising:
   receiving, by a system including a processor, an audio sample;
   generating, by the system, a set of descriptors based on the audio sample;
   generating, by the system, respective sets of hits for reference samples among a set of reference samples based on comparing the set of descriptors to a set of reference descriptors associated with reference samples among the set of reference samples, wherein a hit indicates a match between an audio sample descriptor and a reference descriptor at a sample hit time and a reference hit time;
   generating, by the system, respective histograms for the reference samples based on the sample hit time and the reference hit time for hits in the respective sets of hits for the reference samples;
   rolling, by the system, a window over the respective histograms for respective reference samples wherein the width of the window is based on a time stretch sensitivity;
   upon completion of the rolling, determining, by the system, a maximum number of windowed hits within the window at any point during the roll;
   extracting, by the system, a subset of the set of hits wherein the subset of the set of hits are the hits within the window at the maximum number of windowed hits; and
   evaluating, by the system, sets of histograms to determine a most likely matching histogram.

9. The method of claim 8, further comprising:
   generating, by the system, respective sets of histograms for the reference samples based on at least one of a minimum speed change, a maximum speed change, or a speed step.

10. The method of claim 9, wherein the evaluating the sets of histograms to determine a most likely matching histogram is based on identifying a highest peak.

11. The method of claim 8, further comprising:
    comparing, by the system, the subset of the set of hits with a windowed hit threshold wherein if the subset of hits meets the windowed hit threshold the evaluating the sets of histograms is further based on the subset of hits.

12. The method of claim 8, further comprising:
    estimating, by the system, respective time stretch amounts between the audio sample and the reference samples based on the sample hit times and the reference hit times for hits in the respective sets of hits for the reference samples.

13. The method of claim 12, wherein the generating the respective histograms for the reference samples further based on the respective time stretch amounts associated with the reference samples.

14. A non-transitory computer-readable medium having instructions stored thereon that, in response to execution, cause a system including a processor to perform operations, comprising:
    receiving an audio sample;
    generating a set of descriptors based on the audio sample;
    generating respective sets of hits for reference samples among a set of reference samples based on comparing the set of descriptors to a set of reference descriptors associated with reference samples among the set of reference samples, wherein a hit indicates a match between an audio sample descriptor and a reference descriptor at a sample hit time and a reference hit time;

generating respective histograms for the reference samples based on the sample hit time and the reference hit time for hits in the respective sets of hits for the reference samples;

rolling a window over the respective histograms for respective reference samples wherein the width of the window is based on a time stretch sensitivity;

upon completion of the rolling, determining a maximum number of windowed hits within the window at any point during the roll;

extracting a subset of the set of hits wherein the subset of the set of hits are the hits within the window at the maximum number of windowed hits; and evaluating sets of histograms to determine a most likely matching histogram.

15. The method of claim 14, further comprising:

generating respective sets of histograms for the reference samples based on at least one of a minimum speed change, a maximum speed change, or a speed step.

16. The method of claim 15, wherein the evaluating the sets of histograms to determine a most likely matching histogram is based on identifying a highest peak.

17. The method of claim 14, further comprising:

comparing the subset of the set of hits with a windowed hit threshold wherein if the subset of hits meets the windowed hit threshold the evaluating the sets of histograms is further based on the subset of hits.

18. The method of claim 14, further comprising:

estimating respective time stretch amounts between the audio sample and the reference samples based on the sample hit times and the reference hit times for hits in the respective sets of hits for the reference samples.

19. The method of claim 18, wherein the generating the respective histograms for the reference samples further based on the respective time stretch amounts associated with the reference samples.

* * * * *